United States Patent
Didcock et al.

(10) Patent No.: US 7,742,579 B2
(45) Date of Patent: Jun. 22, 2010

(54) SIMPLIFIED CALL ANSWERING SERVICE

(75) Inventors: Clifford Neil Didcock, Wantage (GB); Michael Geoffrey Andrew Wilson, London (GB); Ruth E. Knap, High Wycombe (GB)

(73) Assignee: Avaya Inc., Basking Ridge, NJ (US)

( * ) Notice: Subject to any disclaimer, the term of this patent is extended or adjusted under 35 U.S.C. 154(b) by 996 days.

(21) Appl. No.: 11/045,770

(22) Filed: Jan. 28, 2005

(65) Prior Publication Data

US 2005/0259795 A1 Nov. 24, 2005

(30) Foreign Application Priority Data

Apr. 1, 2004 (EP) .................................. 04251988

(51) Int. Cl.
*H04M 1/64* (2006.01)
(52) U.S. Cl. .............................. 379/76; 379/41; 379/51; 379/214.01; 379/263
(58) Field of Classification Search ................ 379/67.1, 379/88.13, 88.14, 88.17, 88.05, 41, 51, 68, 379/70–72, 76, 167.08, 214.01, 263, 373.04; 715/706; 714/2
See application file for complete search history.

(56) References Cited

U.S. PATENT DOCUMENTS

| | | | | |
|---|---|---|---|---|
| 6,233,317 | B1 * | 5/2001 | Homan et al. | 379/88.05 |
| 6,434,222 | B1 * | 8/2002 | Shaffer et al. | 379/88.13 |
| 6,687,340 | B1 | 2/2004 | Goldberg et al. | |
| 2002/0131566 | A1 | 9/2002 | Stark et al. | |
| 2003/0223551 | A1 | 12/2003 | Kafri | |
| 2007/0226621 | A1 * | 9/2007 | Dayan et al. | 715/706 |

FOREIGN PATENT DOCUMENTS

| | | |
|---|---|---|
| CA | 2326931 | 5/2002 |
| EP | 04251988 | 8/2004 |
| GB | 2383714 | 7/2003 |
| WO | WO0137525 | 5/2001 |

* cited by examiner

*Primary Examiner*—MD S Elahee
(74) *Attorney, Agent, or Firm*—Chapin IP Law, LLC; David W. Rouille, Esq.

(57) ABSTRACT

There is disclosed a call answering system comprising storage means for storing a user specified address; means for recording voice messages associated with the user; and forwarding means for forwarding recorded voice messages to the user specified address.

16 Claims, 3 Drawing Sheets

SIMPLIFIED CALL ANSWERING SERVICE

The present application claims the priority of European Patent Application No. 04251988.4, filed Apr. 1, 2004.

BACKGROUND TO THE INVENTION

1. Field of the Invention

The invention relates to call answering or voice mail systems, and methods of operation thereof, and particularly but not exclusively to call answering systems traditionally having a centralised storage means for storing voice messages.

2. Description of the Related Art

In general, a required capability of telephony systems is to offer messaging services. Both public systems, such as central office systems and mobile cellular systems, and private systems offer messaging services. Messaging services are typically provided for incomplete calls, that is for calls where a connection to a called user is not completed. Messaging services generally allow a caller to leave a voice message for a user following an incomplete call. This is generally known as "call answering", and typically is initiated when a call is made to a phone which is busy or which is not answered within a predetermined number of rings.

Call answering functionality is generally provided by providing a user of a system with a voice mailbox, which is hosted by a voicemail system within the telephony system. The user of such a system may also be known as a subscriber of the system. The voicemail system equipment typically contains the required logic to answer the telephone call, play a greeting message to the caller, and to record a voice message from the caller. The voicemail system typically further contains a persistent storage mechanism, a portion of which is provided for storage of voice messages for a particular user or subscriber.

Thus, each user or subscriber typically disadvantageously creates a cost which is associated with the storage resources necessary for providing a voicemail mailbox, as well as the management and administration tasks associated with the voicemail storage.

Voicemail systems provided in conjunction with private branch exchanges (PBXs) tend to be highly functional systems offering not only call answering functionality, but other messaging functionality. This other messaging functionality may include over-the-phone subscriber access to enable retrieval of messages stored in a subscriber mailbox, and inter-personal messaging capability, i.e. the capability of subscribers to compose and send voice messages directly to other voicemail subscribers within the system.

In public telephony network deployments, the inter-personal messaging capability is typically not provided, such as in residential land-line voice messaging systems and cellular telephone voice messaging systems.

However, in all systems where call answering functionality is provided, either in private or public telephony systems, there is a requirement for the service supplied to be managed and the message storage paid for.

SUMMARY OF THE INVENTION

The invention provides a call answering system comprising storage means for storing a user specified address; means for recording voice messages associated with the user; and forwarding means for forwarding recorded voice messages to the user specified address.

The user specified address is preferably an address of an electronic storage location. The electronic storage location is preferably an address of a preferred message store destination. The user specified address is preferably an e-mail address. The e-mail address is preferably an SMTP address.

The user may be further associated with a telephone number.

The forwarding means may comprise means for forwarding the audio file as an attachment to an email message.

The call answering system may further include means for configuration and storage of a user defined e-mail address in association with a user specific telephone number.

The means for configuration and storage of the e-mail address may include an interface to a website.

The means for configuration and storage of the e-mail address may include an interface to a handset, with an alphabetic entry capability, associated with the telephone number.

The invention further provides, in a call answering system, a method comprising: configuring the answering system, including the step of providing a user specified address to which voice messages associated with a user are to be delivered; and on activation of a call answering service, further including the steps of receiving a call to a user telephone number; playing a recorded announcement associated with the user telephone number; recording a message; and transmitting the recorded message to the user specified address.

The user specified address is preferably an address of an electronic storage location. The electronic storage location is preferably an address of a preferred message store destination. The user specified address is preferably an e-mail address. The e-mail address is preferably an SMTP address.

The step of recording may comprise generating an audio file containing the message. The step of transmitting may comprise sending an e-mail with said audio file as an attachment.

The invention still further provides a method of configuring a call answering system, comprising: providing a user specified address to which voice messages associated with a user telephone number are to be delivered.

The user specified address is preferably an address of an electronic storage location. The electronic storage location is preferably an address of a preferred message store destination. The user specified address is preferably an e-mail address. The e-mail address is preferably an SMTP address.

The invention yet further provides a method of operating a call answering system comprising receiving a telephone call to a called telephone number; playing a recorded announcement associated with the called telephone number; recording an audio message for the called telephone number; and transmitting said audio message to a user specified address.

The user specified address is preferably an address of an electronic storage location. The electronic storage location is preferably an address of a preferred message store destination. The user specified address is preferably an e-mail address. The e-mail address is preferably an SMTP address.

Advantageously, the invention removes, minimises or reduces the expense associated with providing a specific voice message storage mechanism, while offering additional functionality to a user. The call answering process provided in accordance with embodiments of the invention is significantly simplified over the prior art, and allows for associated simplification in the telephone system equipment which is deployed.

The invention further provides service 'leverage' and the creation of customer loyalty for network suppliers who are also Internet service providers (ISPs) supplying email services.

BRIEF DESCRIPTION OF THE FIGURES

The invention is now described with regard to particular examples and by way of reference to the accompanying Figures, in which.

DESCRIPTION OF THE PREFERRED EMBODIMENTS

The invention is described herein by way of reference to particular, non-limiting examples. In particular the invention is described in the context of a private branch exchange (PBX) system implementing call answering functionality. It will be understood by one skilled in the art, having reference to the following description, that the invention is not limited in its applicability to such a system. The wider applicability of the invention is discussed further hereinbelow.

Figure 1:
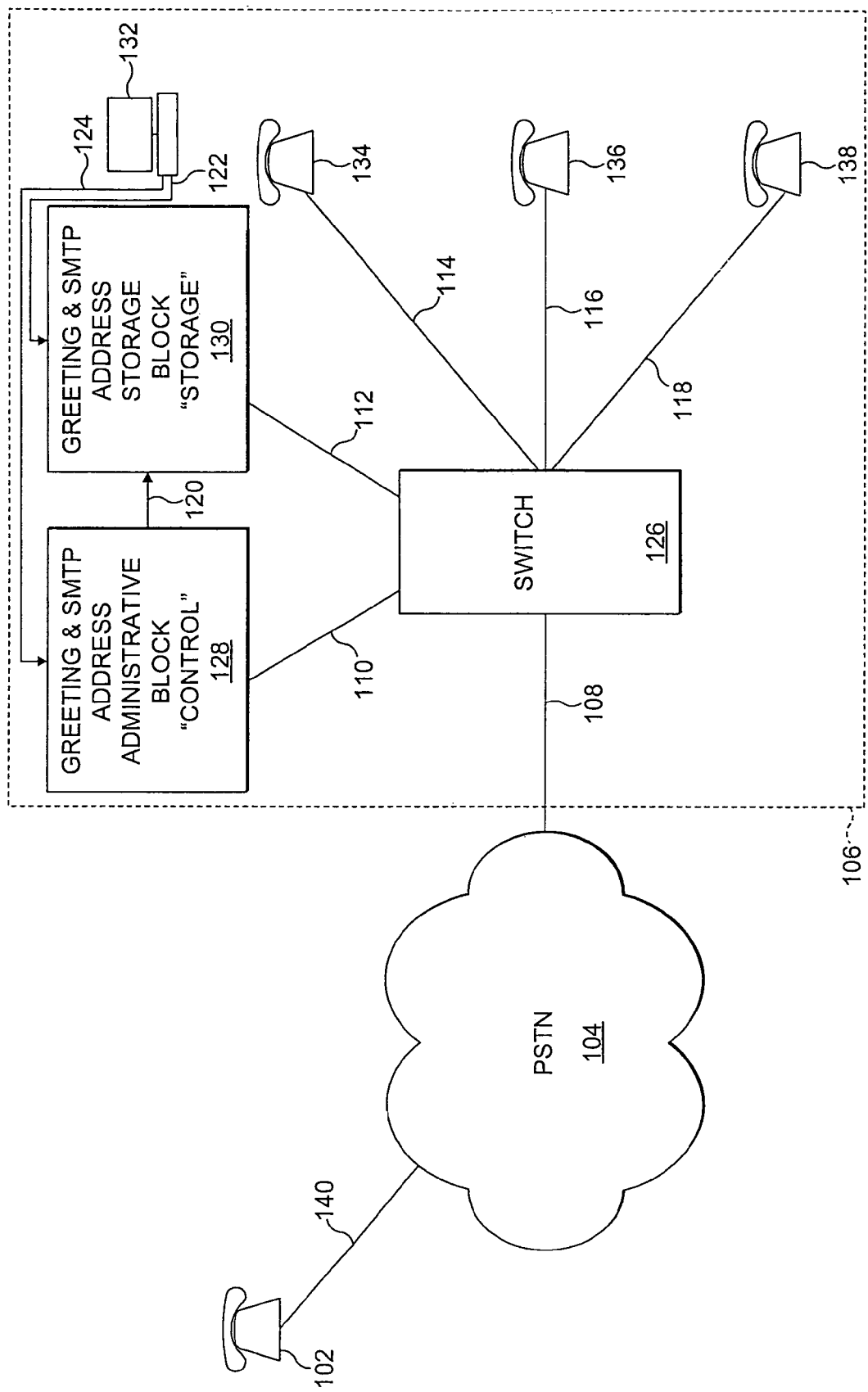
FIG. 1 illustrates an exemplary telephone system within which embodiments of the invention may be utilised.

Referring to FIG. 1, there is generally illustrated by reference numeral 106 a PBX system. The PBX system includes a switching entity, identified as a switch 126, which is preferably a PBX switch. The switch 126 is provided with a connection 108 which offers an interface to a public switched telephone network (PSTN) 104. The PSTN 104 may have connections to other private branch exchanges, and to other telephone users such as a user associated with a telephone 102. The telephone 102, in this example, is a telephone connected to the public telephone network, and has a connection 140 directly to the PSTN 104.

The PBX 106 supports a plurality of users, such as users associated with telephone handsets 134, 136 and 138. In practice, there may be provided a significantly higher number of handsets and users. Each of the handsets 134, 136, 138 is connected to the switch 126 via a communication line 114, 116, 118 respectively. In one embodiment, each handset is dedicated for use with a particular user. Thus, for example, the handset 134 is uniquely associated with a particular user.

FIG. 1 additionally shows, in accordance with an embodiment of the invention, that the PBX 106 includes a control block or control means 128 and a storage block or storage means 130. The control means 128 and the storage means 130 are each connected to the switch 126 via communication lines 110 and 112 respectively. In addition the control means 128 and the storage means 130 are interconnected via a communication link 120.

In accordance with the described embodiment of the invention, the control means 128 comprises the functionality of a greeting and SMTP address administration block. Similarly in accordance with an embodiment of the invention, the storage means 130 provides the functionality of a greeting and SMTP address storage block. It should be noted that the control means 128 and the storage means 130 may additionally provide other functionality of the PBX system, and more particularly the functionality of messaging services within the PBX system. However in the present description only those aspects of the functionality of the control means 128 and storage means 130 are described which are relevant to a discussion of the invention.

Also shown in FIG. 1 is a computer terminal 132, having a logical communication link 122 to the storage means 130 and a communication link 124 to the control means 128. As is described further hereinbelow, the computer terminal 132 may be utilised by a user in order to configure information contained in either one of the control means 128 or the storage means 130.

The operation of the PBX 106 in accordance with an embodiment of the invention will now be described with reference to the flow processes of FIGS. 2 and 3.

Figure 2:
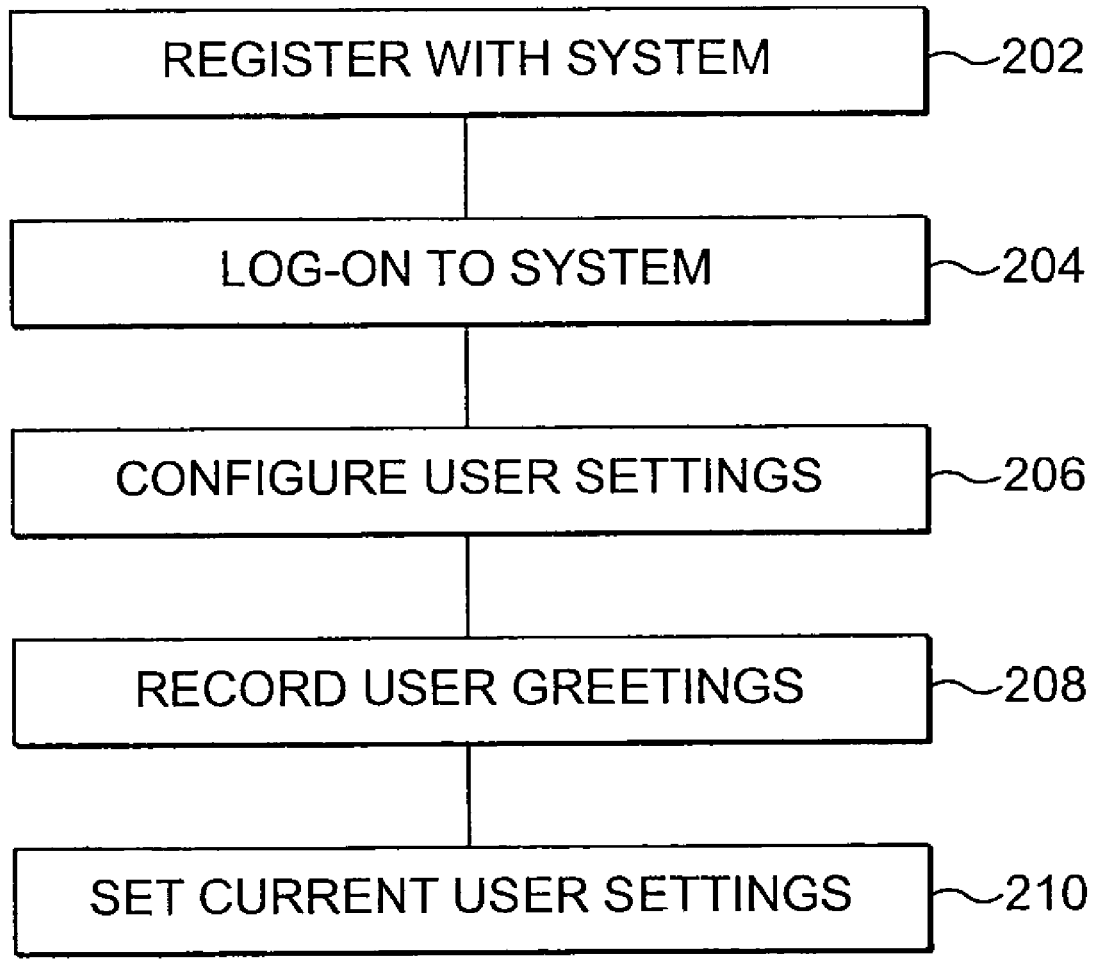
FIG. 2 illustrates a user registration process in accordance with an embodiment of the invention.

Referring to FIG. 2, the registration or subscription process for a user of the PBX system 106 is first described. In a step 202, a user registers with the system. In practice, the user may be automatically registered with the system by being allocated a telephone extension on the PBX system. However a user having a handset associated with the PBX system may alternatively need to specifically register through a registration process in order to enable call answering services. The invention is not concerned with the registration of a user with the system, and any conventional technique known in the art for a user registering with a system may be used. Following the registration process, the user effectively becomes a subscriber of the system.

It should be noted that in applications other than PBX applications, such as public telephony networks, the user typically will have to specifically subscribe in order to obtain call answering services.

The technique for the registration/subscription will be implementation dependent. The registration may be able to take place by the user using their telephone handset, either by telephoning a registration number and following a series of voice prompts, and/or by entering information on the keypad of their telephone handset. In a preferable alternative, a user may use a computer system, such as computer system 132, to register through a website, either intranet or extranet. Where a computer is used, it may be expected that during the registration process the user is required to provide the telephone number associated with their telephone handset.

In an embodiment, initial registration of the user may be carried out using a telephone handset, utilising some form of PIN as known in typical voice mail systems. The configuration of the users preferences, after initial registration, may then be carried out through computer access. In particular, as will be understood from the following description, the configuration of user preferences in accordance with embodiments of the invention is preferably carried out using a computer.

In a further alternative arrangement the registration process, and/or the subsequent configuration process, may utilise natural language recognition techniques or speech recognition techniques, such that the registration and/or configuration process may at least in part be carried out using voice commands.

Once a user is registered with the system, then they may at any time log-on to the system, as denoted by step 204 of FIG. 2. By logging-on to the system, the user is able to utilise call answering services, and potentially other messaging services, and adapt and configure the settings associated with their registration. Again, the user may log-on to the system using their telephone handset, or preferably using a computer.

Once logged-on to the system, the user may configure their settings, as denoted by step 206. The user settings are preferably stored in the control means 128. The user settings may include, for example, the parameters associated with the operation of the call answering system. Thus a particular user may set the number of rings allowed before it is decided that there is no reply at the handset and call answering is enabled.

In a step 208, the user is able to record user greetings. The user greetings are stored in the storage means 130. Thus the user may record a greeting which is played back to a caller when there is no reply in a call made to the user's handset.

In an embodiment a user may record an audio greeting, for example, using an audio recording function provided on a computer, and e-mail such audio greeting to the system administrator. The e-mail may include in the subject line a command which indicates the purpose of the attached file. In general, the purpose of the attached file would be to substitute for a current greeting message. The source address of the e-mail would confirm the user with which the e-mail is associated, and the optional inclusion of a PIN number or other security feature in the subject line of the e-mail body may authenticate the source of the user. In this way, a user may simply record a new audio greeting at any location, and e-mail to the system to update their answering service greeting message.

In a step 210, the user may set current user settings. For example, the user may have the option to disable call answering services when they wish. The user may also have the option to divert all calls to the call answering service automatically, for example in a "do not disturb" mode. The current user settings for any given user are stored in the control means 128.

In accordance with the invention, in this embodiment the user also configures, in step 206, an SMTP e-mail address. This is an e-mail address to which the user requires voice messages to be sent to. This may be any e-mail address determined by the user, preferably an SMTP address. In embodiments the user may be able to configure multiple e-mail addresses to which the voicemails are sent, or may be able to provide multiple e-mail addresses, and set incoming telephone numbers with such e-mail addresses, such that voice messages from different callers are directed to different e-mail addresses. All these user settings for configuring the call answering system for a particular user are stored in a control means 128, with an entry for that particular user.

It will be understood that a typical telephone handset, such as used in an enterprise environment, is not equipped with an appropriate user interface for entry of SMTP addresses. As such, the use of a computer terminal for such operation is preferable. However in other applications, such as where a mobile telephone handset is used for registration, the handset may be suitable for entering the e-mail address.

It should be noted that after initial registration, a user may log-on to the system at step 204 at any stage, and adapt their user settings in step 206, record alternative user greetings in step 208, and set alternative current user settings in step 210.

Figure 3:
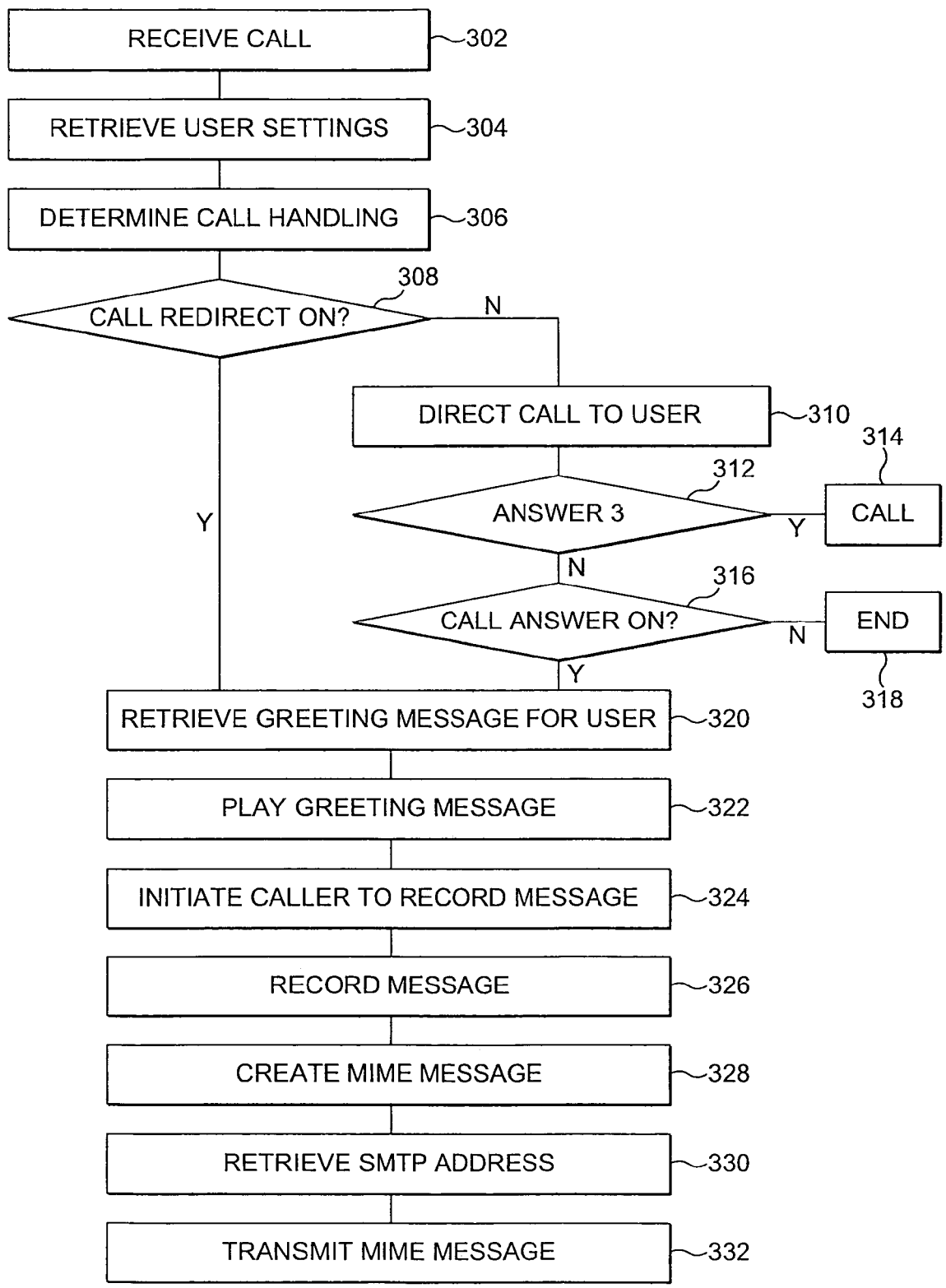
FIG. 3 illustrates the handling of a call in a call answering system in accordance with an embodiment of the invention.

With reference to FIG. 3, the invention is now further described by way of further example with reference to the processing of an incoming call. For the purposes of this example, it is assumed that a user associated with a telephone handset 102 places a call to a user associated with a telephone handset 134. The user associated with a telephone handset 134 has enabled call answering functionality, which allows for voicemail messaging when there is no answer to the call.

The call is made from the handset 102 and established on the communication line 140 to the PSTN 104. As known in the art, the call is directed through the PSTN 104 to the interface 108 associated with the PBX 106, where it is received by the PBX switch 126. Step 302 of FIG. 3 denotes receipt of the call at the switch 126.

Based on the destination telephone number, the switch 126 retrieves the user settings for the user associated with a destination number from the control means 128 via communication link 110. In an embodiment, the switch 126 may provide the destination telephone number to the control means 128, and the information associated with the user returned to the switch in dependence thereon. Thus, in a step 304, the user settings for the destination number are retrieved by the switch.

The switch 126 then determines the call handling for the incoming call, in dependence on the retrieved user settings, as denoted by step 306.

In a step 308, the switch 126 first determines whether the user has enabled "call redirect". The user may enable call redirect in "do not disturb" mode, requiring all calls to be diverted to voicemail. If call redirect is enabled, then the process proceeds directly to step 320, as described further hereinbelow.

If call redirect is not enabled, then from step 308 the process moves on to step 310, and the switch 126 directs the call to the destination number in accordance with known techniques. Thus, the switch 126 directs the call on communication line 114 to handset 134.

In step 312, it is determined whether the call is answered. Again, the switch 126 may apply user settings, which determine the number of rings allowed before a call is diverted to voicemail. If the call is answered, then in step 314 the call proceeds.

If the call is not answered, then in the step 316 the switch 126 determines whether the call answering functionality is switched on. If the call answering functionality is not switched on, and the call has not been answered, then in step 318 the call is terminated. If the call answering is switched on, then the process proceeds to step 320.

In step 320, the switch 126 retrieves the greeting message for the user from the storage means 130 via communication link 112. In step 322 the greeting message is then played to the caller associated with the handset 102. In step 324, the caller is then prompted, or initiated, to record a message for the user. In step 326, the message is then recorded.

In a step 328, a MIME message is then created. A MIME message is an e-mail message using the RFC822/MIME format. Such a message is provided with a PC-compatible audio attachment consisting of the recorded message left by the caller.

The recorded audio file is preferably held in a cache in the call answering system, or in temporary disk storage, between being recorded and being sent.

In a step 330, the switch 126 then retrieves from the storage means 130 the e-mail address, preferably an SMTP address, for the user via the communication link 112. In step 332, the PC-compatible audio attachment is transmitted using the MIME message, to the user defined SMTP e-mail address.

The message, including the audio attachment, is then sent for delivery to the mailbox of the subscriber's choice. This might be their own personal e-mail mailbox, such as one provided by an internet service provider, or to their enterprise (i.e. work) e-mail mailbox.

It can be understood from the foregoing description that the process associated with answering a call, and recording and accessing a voice message, in accordance with embodiments of the invention, no longer includes the necessity for long-term storage and management of voice messages within the telephony system. These messages are instead composed as e-mail messages, complete with a PC-compatible audio attachment, for example, and sent to the mailbox associated with the configured email address of the users choice.

In the described embodiments, the recorded voice messages are forwarded to at least one e-mail address, preferably an SMTP address, defined by the user. However the invention is not limited to the forwarding of recorded voice messages to e-mail addresses. In general, however, the invention provides for the forwarding of recorded voice messages to a user-specified address. The user specified address may be an address of an electronic storage location, such as an e-mail address or a network directory.

The audio file is a digital encoding of the callers message. The encoding preferably uses both an open audio encoding format, e.g. GSM audio, and a well known file format (e.g. WAV). The invention is not limited to any specific audio encoding or file format. Preferably, the technique is implemented using formats which are as open and as widely playable as possible.

In embodiments, the techniques of the invention may be further modified to provide for non-delivery reports, where delivery of the voice message to the designated e-mail address is unsuccessful, for example where the mailbox associated with the e-mail address is full or has been deleted. In a preferred embodiment, e-mail messages may be sent with a 'return-to' address being a configured administrator e-mail address. Such non-delivery reports may then be used by the system administrator to attempt later delivery of the message (where the mailbox is full), or to delete an e-mail address from a users settings (where the mailbox has been deleted).

The invention has been described in the context of the provision of call answering services in accordance with preferred examples in a PBX system. The techniques of the present invention may be applied to existing conventional voice mail systems. For example, the capability to define external SMTP e-mail addresses, as per embodiments of the invention, may be added for some or all users of an existing system. For such users, the messages are then stored off-system. For those users that are not provided with such functionality, a smaller and less expensive centralised message store is required.

The invention, and embodiments thereof, offer a number of benefits over the prior art.

The subscriber may receive their voice messages in any email mailbox of their choice. They may, for example, choose to receive their voice and e-mail messages in the same mailbox. This simplifies matters for the subscriber and will generally result in a more rapid retrieval of voice messages.

There is a considerable simplification in the telephone system handling the call if there is no need to provide subscribers with "mailboxes" within the telephony system. This allows considerable simplification in these systems while continuing to offer the required and expected functionality. The telephone system is no longer required to have the responsibility to store and manage messages, as all it needs to do is to send them on to a separate e-mail address.

Public network suppliers who also supply internet e-mail can therefore differentiate their services by providing for integration of voice and e-mail through a single solution. This will enhance the creation of customer loyalty for both services.

The invention, and embodiments thereof, ideally lend themselves to applicability in telephony systems having a centralised call answering service. Thus the invention ideally can be utilised in systems typically having a centralised call answering service with a centralised message store, the implementation of the invention resulting in the elimination of the centralised message store.

The invention may also be implemented in telephony systems where there is no centralised handling of call answering. In such systems, the individual handsets may be provided with their call answering systems, which are not centrally controlled or connected. The invention may still be utilised to provide for the creation of audio files based on voice messages left in the telephone handset, and the forwarding of such audio files to e-mail addresses configured by the user of the handset.

The invention has been described herein by way of reference to particular examples. In particular the invention has been described in the context of a PBX call answering system, having centralised messaging administration and control. One skilled in the art will appreciate that the invention has broader applicability than the described embodiments. The scope of protection afforded by the invention is defined in the appended claims.

The invention claimed is:

1. A call answering system comprising:
   storage means for storing a user specified address;
   means for recording voice messages associated with the user; and
   forwarding means for forwarding recorded voice messages to the user specified address;
   wherein the recorded voice messages are forwarded to a return address which is an administrator address of the system when said user specified address is unavailable;
   wherein a greeting message recorded by the user is forwarded from the user to the administrator address of the system such that the system substitutes said message for a current greeting message.

2. The call answering system according to claim 1 wherein the user specified address is an e-mail address.

3. The call answering system according to claim 2 wherein the e-mail address is an SMTP address.

4. The call answering system according to claim 1 wherein the user is further associated with a telephone number.

5. The call answering system according to claim 2 wherein the forwarding means comprises means for forwarding an audio file as an attachment to an email message.

6. The call answering system according to claim 2 further comprising means for configuration and storage of a user defined e-mail address in association with a user defined phone number.

7. The call answering system according to claim 6 wherein the means for configuration and storage of the e-mail address includes an interface to a website.

8. The call answering system according to claim 6 wherein the means for configuration and storage of the e-mail address includes an interface to a handset, with an alphabetic entry capability, associated with the telephone number.

9. A method for use in a call answering system, the method comprising:
   configuring the answering system, including the step of providing a user specified address to which voice messages associated with a user are to be delivered;
   activating a call answering service; and
   on activation of the call answering service, further including the steps of:
   receiving a call to a user telephone number;
   playing a recorded announcement associated with the user telephone number;
   recording a message; and
   transmitting the recorded message to the user specified address;
   wherein the recorded message is transmitted to a return address which is an administrator address of the system when said user specified address is unavailable;
   wherein the recorded announcement is based on a greeting message recorded by the user and transmitted to the administrator address of the system such that the system substitutes said greeting message for a current greeting message.

10. The method according to claim 9 wherein the user specified address is an e-mail address.

11. The method according to claim 9 wherein the step of recording comprises generating an audio file containing the message.

12. The method according to claim 11 wherein the step of transmitting comprises sending an e-mail with said audio file as an attachment.

13. A method of configuring a call answering system, comprising:
    providing a user specified address to which voice messages associated with a user telephone number are to be delivered;
    wherein the voice messages are forwarded to a return address for each of the voice messages an administrator address of the system when said user specified address is unavailable;
    wherein a greeting message recorded by the user is forwarded from the user to the administrator address of the system such that the system substitutes said message for a current greeting message.

14. The method according to claim 13 wherein the user specified address is an e-mail address.

15. A method of operating a call answering system, comprising:
    receiving a telephone call to a called telephone number;
    playing a recorded announcement associated with the called telephone number;
    recording an audio message for the called telephone number; and
    transmitting said audio message to a user specified address;
    wherein the recorded audio message is transmitted to a return address which is an administrator address of the system when said user specified address is unavailable;
    wherein the recorded announcement is based on a greeting message recorded by the user and transmitted to the administrator address of the system such that the system substitutes said greeting message for a current greeting message.

16. The method according to claim 15 wherein the user specified address is an e-mail address.

* * * * *